US010957339B2

(12) United States Patent
Cao et al.

(10) Patent No.: US 10,957,339 B2
(45) Date of Patent: Mar. 23, 2021

(54) SPEAKER RECOGNITION METHOD AND APPARATUS, COMPUTER DEVICE AND COMPUTER-READABLE MEDIUM

(71) Applicant: BAIDU ONLINE NETWORK TECHNOLOGY (BEIJING) CO., LTD., Beijing (CN)

(72) Inventors: Ying Cao, Beijing (CN); Xiao Liu, Beijing (CN); Peng Hu, Beijing (CN); Jie Zhou, Beijing (CN); Shilei Wen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 137 days.

(21) Appl. No.: 15/912,348

(22) Filed: Mar. 5, 2018

(65) Prior Publication Data

US 2018/0261236 A1 Sep. 13, 2018

(30) Foreign Application Priority Data

Mar. 10, 2017 (CN) .......................... 201710142901.8

(51) Int. Cl.
*G10L 25/30* (2013.01)
*G10L 15/06* (2013.01)
(Continued)

(52) U.S. Cl.
CPC ............ *G10L 25/30* (2013.01); *G06F 16/683* (2019.01); *G06N 3/0454* (2013.01); *G06N 3/08* (2013.01);
(Continued)

(58) Field of Classification Search
CPC ....... G10L 25/30; G10L 15/063; G10L 15/02; G10L 17/18; G10L 17/02; G10L 17/04;
(Continued)

(56) References Cited

U.S. PATENT DOCUMENTS 5,579,436 A * 11/1996 Chou .................... G10L 15/063
704/236
9,378,733 B1 * 6/2016 Vanhoucke ............. G10L 15/02
(Continued)

FOREIGN PATENT DOCUMENTS

| CN | 102737633 A | 10/2012 |
|---|---|---|
| CN | 104732978 A | 6/2015 |

(Continued)

OTHER PUBLICATIONS

Hertel L, Phan H, Mertins A. Classifying variable-length audio files with all-convolutional networks and masked global pooling. arXiv preprint arXiv:1607.02857. Jul. 11, 2016.*

(Continued)

*Primary Examiner* — Edwin S Leland, III
(74) *Attorney, Agent, or Firm* — Ladas & Parry, LLP (57) ABSTRACT

The present disclosure provides a speaker recognition method and apparatus, a computer device and a computer-readable medium. The method comprises: receiving target speech data of a to-be-recognized user in a target group; according to the target speech data, a pre-collected speech database and a pre-trained speaker recognition model, obtaining speech output features corresponding to the target speech data and speech output features corresponding to each of said speech data in the speech database; the speaker recognition model employs a convolution neural network model; recognizing the user corresponding to the target speech data according to the speech output features corresponding to the target speech data and the speech output features corresponding to each of said speech data in the speech database. By employing the speaker recognition model based on the convolution neural network model, the present disclosure can accurately obtain the speech output features of each speech data, thereby more accurately recognizing the user corresponding to the target speech data and (Continued)

thereby substantially improving the efficiency of recognizing speakers.

15 Claims, 4 Drawing Sheets

(51) Int. Cl.
*G06N 5/04* (2006.01)
*G10L 15/02* (2006.01)
*G06F 16/683* (2019.01)
*G10L 17/18* (2013.01)
*G06N 3/04* (2006.01)
*G06N 3/08* (2006.01)
*G10L 17/04* (2013.01)
*G10L 17/02* (2013.01)
*G06N 7/00* (2006.01)

(52) U.S. Cl.
CPC ............. *G06N 5/046* (2013.01); *G10L 15/02* (2013.01); *G10L 15/063* (2013.01); *G10L 17/18* (2013.01); *G06N 7/005* (2013.01); *G10L 17/02* (2013.01); *G10L 17/04* (2013.01)

(58) Field of Classification Search
CPC ....... G10L 25/12; G10L 25/24; G06F 16/683; G06N 5/046; G06N 7/005; G06N 3/0454; G06N 3/08
USPC ......................................................... 704/254
See application file for complete search history.

(56) References Cited

U.S. PATENT DOCUMENTS

| | | | |
|---|---|---|---|
| 2017/0140253 A1* | 5/2017 | Wshah | G06N 3/08 |
| 2017/0147944 A1* | 5/2017 | Csurka | G06N 3/0454 |
| 2017/0243113 A1* | 8/2017 | Fukuda | G06N 3/0454 |
| 2017/0287490 A1* | 10/2017 | Biswal | G10L 15/20 |
| 2017/0372174 A1* | 12/2017 | Wshah | G06N 3/0454 |
| 2018/0053087 A1* | 2/2018 | Fukuda | G06N 3/0454 |
| 2018/0150740 A1* | 5/2018 | Wang | G06K 9/2054 |
| 2018/0174575 A1* | 6/2018 | Bengio | G10L 15/02 |
| 2018/0189281 A1* | 7/2018 | Li | G06N 3/0454 |
| 2018/0261236 A1* | 9/2018 | Cao | G10L 17/18 |
| 2019/0196600 A1* | 6/2019 | Rothberg | G06N 20/20 |
| 2019/0286242 A1* | 9/2019 | Ionescu | G06F 17/15 |
| 2019/0341052 A1* | 11/2019 | Allibhai | G10L 15/22 |
| 2020/0133857 A1* | 4/2020 | Randolph | G06F 3/0656 |

FOREIGN PATENT DOCUMENTS

| | | |
|---|---|---|
| CN | 105321525 A | 2/2016 |
| CN | 105895082 A | 8/2016 |
| CN | 106128465 A | 11/2016 |
| CN | 106328150 A | 1/2017 |

OTHER PUBLICATIONS

First Office Action and Search Report from CN app. No. 201710142901.8, dated May 23, 2019, with English translation provided by Global Dossier.

* cited by examiner

SPEAKER RECOGNITION METHOD AND APPARATUS, COMPUTER DEVICE AND COMPUTER-READABLE MEDIUM

The present application claims the priority of Chinese Patent Application No. 201710142901.8, filed on Mar. 10, 2017, with the title of "Speaker recognition method and apparatus, computer device and computer-readable medium", the entire disclosure of which is hereby incorporated by reference in its entirety.

FIELD OF THE DISCLOSURE

The present disclosure relates to the technical field of computer application, and particularly to a speaker recognition method and apparatus, a computer device and a computer-readable medium.

BACKGROUND OF THE DISCLOSURE

Speaker Recognition (SR), also called Voiceprint Recognition (VPR), is a type of biological recognition technology, and specifically means judging who speaks a sentence through speech.

The voiceprint recognition in the prior art comprises text-dependent voiceprint recognition and text-independent voiceprint recognition. A text-dependent voiceprint recognition system requires a user to utter a speech according to prescribed content, and each person's voiceprint model is precisely built. Upon recognition, the user must utter the speech according to the prescribed content to thereby achieve a better recognition effect. However, the system needs the user's cooperation. If the speech uttered by the user does not conform to the prescribed content, the user cannot be correctly recognized. A text-independent recognition system does not prescribe the content uttered by the speaker, and it is relatively difficult to build a model. However, the user uses the system conveniently and the system can be applied in a wider scope. For example, in a text-independent speaker recognition scheme in the prior art, a Gaussian mixture model is mainly used to learn a Gauss cluster center from a lot of speech and background sound data, as i-vecotr corresponding to the speaker's speech data. As for each speech data to be recognized, the i-vecotr of the speech data to be recognized is obtained. Then, similarity calculation is performed for the i-vecotr of the speech data to be recognized and i-vecotr of each known speaker's speech data, and the speaker to be recognized is recognized as a speaker corresponding to speech data with the highest similarity.

However, the scheme in the prior art of using a Gaussian mixture model to learn a Gauss cluster center from a lot of speech and background sound data, as i-vecotr corresponding to the speaker's speech data is a linear processing scheme. The learnt i-vecotr cannot very accurately characterize features of the speaker's speech data, which causes a lower speaker recognition efficiency.

SUMMARY OF THE DISCLOSURE

The present disclosure provides a speaker recognition method and apparatus, a computer device and a computer-readable medium to improve the speaker recognition efficiency.

The present disclosure provides a speaker recognition method, comprising:

receiving target speech data of a to-be-recognized user in a target group;

according to the target speech data, a pre-collected speech database and a pre-trained speaker recognition model, obtaining speech output features corresponding to the target speech data and speech output features corresponding to each of said speech data in the speech database; the speaker recognition model employs a convolution neural network model;

recognizing the user corresponding to the target speech data according to the speech output features corresponding to the target speech data and the speech output features corresponding to each of said speech data in the speech database.

Further optionally, in the aforesaid method, before the step of, according to the target speech data, a pre-collected speech database and a pre-trained speaker recognition model, obtaining speech output features corresponding to the target speech data and speech output features corresponding to each of said speech data in the speech database, the method further comprises:

collecting several training speech data of known user identifiers, and generating a training speech database;

according to each training speech data in the training speech database, obtaining a Mel-Frequency Cepstral Coefficient and/or a Perceptual Linear Predictive feature of each training speech data, as a corresponding speech input feature of the training speech data;

training the speaker recognition model according to the speech input feature of each training speech data and the user identifier of each of said training speech data.

Further optionally, in the aforesaid method, the training the speaker recognition model according to the speech input feature of each training speech data and the user identifier of each of said training speech data specifically comprises:

inputting the speech input feature of each training speech data in the training speech database in turn to the speaker recognition model, and obtaining a corresponding speech output feature of the training speech data;

generating a loss function of training speech data according to the speech output feature of the training speech data and the user identifier of the training speech data;

calculating derivatives of the loss function of the training speech data for parameters in the speaker recognition model;

according to the parameters and the derivatives of the loss function of the training speech data for the parameters in the speaker recognition model, updating the parameters in the speaker recognition model to thereby determine the speaker recognition model after the training this time;

repeatedly executing the above steps until several training speech data in the training speech database train the speaker recognition model and determine the speaker recognition model after this round of training.

Further optionally, in the aforesaid method, the training the speaker recognition model according to the speech input feature of each training speech data and the user identifier of each of said training speech data further comprises:

training the speaker recognition model according to several said training speech data in the training speech database in aforesaid each round of training, and using the several training speech data in the training speech database to repeatedly train the speaker recognition model N rounds, to obtain a final speaker recognition model.

Further optionally, in the aforesaid method, the recognizing the user corresponding to the target speech data according to the speech output features corresponding to the target speech data and the speech output features corresponding to each of said speech data in the speech database specifically comprises:

respectively calculating similarity between the speech output features corresponding to the target speech data and the speech output features corresponding to each speech data in the speech database;

obtaining a user identifier corresponding to speech data whose similarity with the speech output features corresponding to the target speech data is larger than or equal to a preset similarity threshold, as an identifier of the user corresponding to the target speech data; or obtaining a user identifier corresponding to speech data whose similarity with the speech output features corresponding to the target speech data is a maximum, as an identifier of the user corresponding to the target speech data.

The present disclosure further provides a speaker recognition apparatus, comprising:

a receiving module configured to receive target speech data of a to-be-recognized user in a target group;

a feature obtaining module configured to, according to the target speech data, a pre-collected speech database and a pre-trained speaker recognition model, obtain speech output features corresponding to the target speech data and speech output features corresponding to each speech data in the speech database; the speaker recognition model employs a convolution neural network model;

a recognizing module configured to recognize the user corresponding to the target speech data according to the speech output features corresponding to the target speech data and the speech output features corresponding to each of said speech data in the speech database.

Further optionally, the above apparatus further comprises: a collecting module and a training module;

wherein the collecting module is configured to collect several training speech data of known user identifiers, and generate a training speech database;

the feature obtaining module is further configured to, according to each training speech data in the training speech database, obtain a Mel-Frequency Cepstral Coefficient and/or a Perceptual Linear Predictive feature of each training speech data, as a corresponding speech input feature of the training speech data;

the training module is configured to train the speaker recognition model according to the speech input feature of each training speech data and the user identifier of each of said training speech data.

Further optionally, in the aforesaid apparatus, the training module is specifically configured to:

input the speech input feature of each training speech data in the training speech database in turn to the speaker recognition model, and obtain a corresponding speech output feature of the training speech data;

generate a loss function of training speech data according to the speech output feature of the training speech data and the user identifier of the training speech data;

calculate derivatives of the loss function of the training speech data for parameters in the speaker recognition model;

according to the parameters and the derivatives of the loss function of the training speech data for the parameters in the speaker recognition model, update the parameters in the speaker recognition model to thereby determine the speaker recognition model after the training this time;

repeatedly execute the above steps until several training speech data in the training speech database train the speaker recognition model and determine the speaker recognition model after this round of training.

Further optionally, in the aforesaid speaker recognition apparatus, the training module is further specifically configured to train the speaker recognition model according to several said training speech data in the training speech database in aforesaid each round of training, and use the several training speech data in the training speech database to repeatedly train the speaker recognition model N rounds, to obtain a final speaker recognition model.

Further optionally, in the aforesaid speaker recognition apparatus, the recognizing module is configured to:

respectively calculate similarity between the speech output features corresponding to the target speech data and the speech output features corresponding to each speech data in the speech database;

obtain a user identifier corresponding to speech data whose similarity with the speech output features corresponding to the target speech data is larger than or equal to a preset similarity threshold, as an identifier of the user corresponding to the target speech data; or obtain a user identifier corresponding to speech data whose similarity with the speech output features corresponding to the target speech data is a maximum, as an identifier of the user corresponding to the target speech data.

The present disclosure further provides a computer device, comprising:

According to a further aspect of the present disclosure, there is provided an apparatus, comprising one or more processors;

a memory for storing one or more programs, when the one or more programs are executed by the one or more processors, the one or more processors are enabled to implement the aforesaid speaker recognition method.

The present disclosure further provides a computer-readable medium on which a computer program is stored, the program, when being executed by the processor, implementing the aforesaid speaker recognition method.

According to the speaker recognition method and apparatus, the computer device and the computer-readable medium of the present disclosure, it is feasible to receive the target speech data of the to-be-recognized user in the target group; according to target speech data, the pre-collected speech database and the pre-trained speaker recognition model, obtain speech output features corresponding to the target speech data and speech output features corresponding to each speech data in the speech database, wherein the speaker recognition model employs a convolution neural network model; recognize the user corresponding to the target speech data according to the speech output features corresponding to the target speech data and the speech output features corresponding to each speech data in the speech database. In embodiments of the present disclosure, since the speaker recognition model based on the convolution neural network model is employed, it is possible to accurately obtain the speech output features of each speech data, thereby more accurately recognizing the user corresponding to the target speech data and thereby substantially improving the efficiency of recognizing speakers.

DETAILED DESCRIPTION OF PREFERRED EMBODIMENTS

The present disclosure will be described in detail in conjunction with figures and specific embodiments to make objectives, technical solutions and advantages of the present disclosure more apparent.

Figure 1:
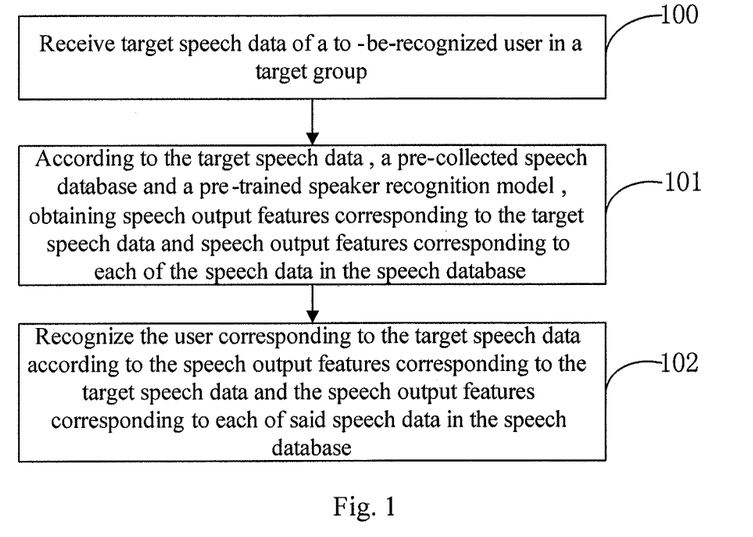
FIG. 1 is a flow chart of Embodiment 1 of a speaker recognition method according to the present disclosure.

FIG. 1 is a flow chart of Embodiment 1 of a speaker recognition method according to the present disclosure. As shown in FIG. 1, the speaker recognition method according to the present embodiment may specifically comprise the following steps:

100: receiving target speech data of a to-be-recognized user in a target group;

101: according to target speech data, a pre-collected speech database and a pre-trained speaker recognition model, obtaining speech output features corresponding to the target speech data and speech output features corresponding to each speech data in the speech database;

102: recognizing the user corresponding to the target speech data according to the speech output features corresponding to the target speech data and the speech output features corresponding to each speech data in the speech database.

The subject for executing the speaker recognition method according to the present embodiment is a speaker recognition apparatus which may be either an electronic device as an entity or a device integrated using software.

The speaker recognition method according to the present embodiment is a speaker recognition method based on a convolution neural network model, namely, the speaker recognition model according to the present embodiment specifically employs a convolution neural network model. According to the speaker recognition method according to the present embodiment, analysis is performed for speech data of a certain user belonging to a certain target group, thereby recognizing which user in the target group the user is. That is to say, before step 100 of the present embodiment, optionally, it is also necessary to collect speech data of each user in the target group, and generate a speech database, and the speech data in the speech database may be stored according to a correspondence relationship between a user identifier and the user's speech data corresponding to the user identifier, so that it may be known that which user each speech data corresponds to and belongs to. Furthermore, the speaker recognition model according to the present embodiment is obtained by training in advance before the user is recognized, and furthermore, upon training of the speaker recognition model according to the present embodiment, the used training speech database may not be related to the collected speech database upon use. That is to say, the speaker recognition model is two independent procedures upon training and upon use. Although the speaker recognition model is trained using the training speech database, it is not only possible to recognize the speaker of each training speech data in the training speech database but also possible to recognize the speaker of any other speech databases other than the training database, that is, the speaker recognition model according to the present embodiment is used very extensively. Before use, it is only necessary to collect the speech data of each user in the target group and generate the speech database, to recognize any user in the target group according to the speech data.

Figure 2:
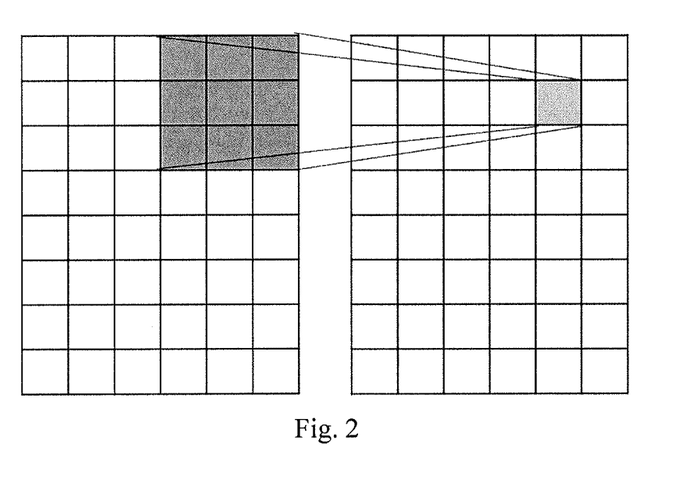
FIG. 2 is a schematic view of a two-dimensional convolution provided in a speaker recognition method according to the present disclosure.
Figure 3:
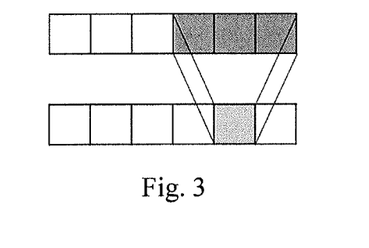
FIG. 3 is a schematic view of a one-dimensional convolution provided in a speaker recognition method according to the present disclosure.

First, when a target speech data is obtained and when it is know that which target group the target speech data belongs to but it is uncertain which person in the target group the target speech data belongs to, it is feasible to input the target speech data into the speaker recognition apparatus to obtain speech output features corresponding to the target speech data and recognize the speaker of the target speech data according to the speech output features of the target speech data and speech output features corresponding to each speech data in the speech database. Correspondingly, the speaker recognition apparatus according to the present embodiment first may receive the target speech data of the to-be-recognized user in the target group; then may obtain the speech output features corresponding to the target speech data according to the target speech data and pre-trained speaker recognition model, and obtain the speech output features corresponding to each speech data in the speech database according to the pre-collected speech database and the pre-trained speaker recognition model. That is to say, in the present embodiment, the speaker recognition model may draw features of the speech data, obtain and output features which best characterize features of the speech data, namely, speech output features. The speaker recognition model according to the present embodiment employs a convolution neural network model. A current ordinary convolution neural network is applied to image data to make a rectangular space into a convolution. Speech data of sound does not have space dimensionality and only has time dimensionality, and features of speech data of sound do not vary with time. Therefore, it is feasible to employ a one-dimension convolution neural network model as the speaker recognition model according to the present embodiment. FIG. 2 is a schematic view of a two-dimensional convolution provided in the speaker recognition method according to the present disclosure. FIG. 3 is a schematic view of a one-dimensional convolution provided in a speaker recognition method according to the present disclosure. It is possible to, by referring to FIG. 2 and FIG. 3, transform the two-dimensional convolution into one-dimension convolution which may be applied to the speaker recognition model according to the present embodiment.

Furthermore, optionally, the step 101 of the present embodiment "according to target speech data, pre-collected speech database and pre-trained speaker recognition model, obtaining speech output features corresponding to the target speech data and speech output features corresponding to each speech data in the speech database" may specifically comprise the following steps:

(a1) respectively extracting an Mel-Frequency Cepstral Coefficient (MFCC) and/or a Perceptual Linear Predictive (PLP) feature of the target speech data and each user's speech data in the speech database, as speech input features of the target speech data and speech input features of each user's speech data;

(a2) according to the speech input features of the target speech data and pre-trained speaker recognition model, obtaining speech output features corresponding to the target speech data;

(a3) according to the speech input features of each user's speech data and the speaker recognition model, obtaining corresponding speech output features of the user's speech data.

Reference may be made to an extracting manner in a relevant speech technical field for a manner of extracting the MFCC and PLP feature from the speech data. Upon recognition of the speaker in the present embodiment, the selected speech input features may only include the MFCC or PLP feature or may include both of them. Furthermore, the amount of information included in the speech input features extracted from the to-be-recognized target speech data should be somewhat identical with the amount of information included by the speech input features of each user's speech data in the speech database. That is, if the speech input features extracted from the to-be-recognized target speech data only include one of the MFCC and PLP feature, the speech input features of each user's speech data in the corresponding speech database also include corresponding MFCC or PLP feature. If the speech input features extracted from the to-be-recognized target speech data include both MFCC and PLP feature, correspondingly the speech input features of each user's speech data in the speech database also include both MFCC and PLP feature. In practical application, the speech input features of the speech data are in a form of matrix. One dimensionality of the matrix is fixed at 60 dimensions, and another dimensionality is related to a length of the speech data: the longer the speech data is, the larger the corresponding dimensionality is. For example, each 10 ms is taken as a reference unit; once the length of the speech data is increased by 10 ms, the corresponding dimensionality will increase by 60, that is, whenever the length of the speech data increases by 1 s, the corresponding dimensionality increases 60*100=6000. As known from the above, as for speech data with different time length, the dimensionality of the corresponding speech input features also vary. In the prior art, when the convolution neural network model is used to perform image classification, input images are consistent in size. Therefore, ordinary convolution neural network models cannot process such type of data. In the convolution neural network model as the speaker recognition model in the present invention, a sequence average-pooling technology may specifically be used to implement processing of data that become longer, namely, speech input features that become longer. The so-called sequence average-pooling technology means considering a sequence with any length as a vector, and considering an average value of all elements of the vector as an output value. As such, it is possible to ensure the speaker recognition model of the present embodiment can output speech output features of a fixed size for the speech input features of speech data of any length. Specifically, the speech input features of the target speech data are input to the pre-trained speaker recognition model, and the speaker recognition model may output the speech output features corresponding to the target speech data. The speech input features of each user's speech data are respectively input to the pre-trained speaker recognition model, and the speaker recognition model may output the speech output features of the user's speech data. Furthermore, the dimensionality of the vector of the speech output features corresponding to the target speech data output by the speaker recognition model is identical with the dimensionality of the vector of the speech output features of each user's speech data output by the speaker recognition model.

Since the speaker recognition model according to the present embodiment employs the convolution neural network model, a procedure of extracting the speech output features of the speech data according to the speech input features of the speech data achieves richer content of characterizing features of the speech data and can more accurately represent the speech data, as compared with the procedure of obtaining the i-vecotr by using Gaussian mixture model in a linear manner in the prior art.

In the speaker recognition method according to the present embodiment, when the collected speech database and the speaker recognition model are certain, it is also feasible to pre-obtain, according to step (a3), the speech output features of each user's speech data in the pre-collected speech database, and store the speech output features in the speech database. Upon storing, it is feasible to store, according to the user index number, corresponding speech output features of the user's speech data; or to re-build a speech output feature database to purposefully store the speech output features corresponding to the speech data in the speech database. When the speaker recognition is performed, it is feasible to only obtain the speech output features of the target speech data, then directly obtain, from the speech database or speech output feature database, the pre-stored speech output features of each user's speech data, and then directly perform subsequent processing of the speaker recognition; this may save the flow of speaker recognition each time, save the duration of speaker recognition and improve the speaker recognition efficiency.

Further optionally, step 102 of the present application "recognizing the user corresponding to the target speech data according to the speech output features corresponding to the target speech data and the speech output features corresponding to each speech data in the speech database" may specifically comprise the following steps:

(b1) respectively calculating similarity between the speech output features corresponding to the target speech data and the speech output features corresponding to each speech data in the speech database;

(b2) obtaining a user identifier corresponding to speech data whose similarity with the speech output features corresponding to the target speech data is larger than or equal to a preset similarity threshold, as an identifier of the user corresponding to the target speech data; or obtaining a user identifier corresponding to speech data whose similarity with the speech output features corresponding to the target speech data is a maximum, as an identifier of the user corresponding to the target speech data.

Since the speech output features corresponding to the target speech data of the present embodiment and the speech output features corresponding to each speech data in the speech database are both represented using a vector, a similarity value may be calculated between the speech output features corresponding to the target speech data and the speech output features corresponding to each speech data in the speech database. Then, it is feasible to obtain, from the speech database, speech data corresponding to the speech output features whose similarity with the the target speech data is larger than or equal to the preset similarity threshold, and take the user identifier corresponding to the speech data as the user identifier corresponding to the target speech data, namely, identify the user corresponding to the speech data as the user corresponding to the target speech data. The present similarity threshold according to the present embodiment may be set as 95%, 90% or other percentages between 0-1 according to actual needs. Preferably, the preset similarity threshold at least needs to be larger than 60%. Alternatively, it is possible to obtain the largest similarity value directly from a plurality of obtained similarity values, obtain, from the speech database, the user identifier corresponding to the speech data corresponding to the largest similarity value, and take the user identifier corresponding to the speech data as the user identifier corresponding to the target speech data, namely, identify the user corresponding to the speech data as the user corresponding to the target speech data. Alternatively, it is feasible to use the above two schemes in combination, first judge whether there exist a similarity value larger than or equal to the present similarity threshold according to the plurality of obtained similarity values, and, if the similarity value exists, directly take the user identifier corresponding to the speech data corresponding to the similarity value larger than or equal to the present similarity threshold; and if the similarity value does not exist, obtain the largest similarity value therefrom and obtain, from the speech database, the user identifier corresponding to the speech data corresponding to the largest similarity value, as the user identifier corresponding to the target speech data.

According to the speaker recognition method of the present embodiment, it is feasible to receive the target speech data of the to-be-recognized user in the target group; according to target speech data, the pre-collected speech database and the pre-trained speaker recognition model, obtain speech output features corresponding to the target speech data and speech output features corresponding to each speech data in the speech database, wherein the speaker recognition model employs the convolution neural network model; recognize the user corresponding to the target speech data according to the speech output features corresponding to the target speech data and the speech output features corresponding to each speech data in the speech database. In the present embodiment, since the speaker recognition model based on the convolution neural network model is employed, it is possible to accurately obtain the speech output features of each speech data, thereby more accurately recognizing the user corresponding to the target speech data and thereby substantially improving the efficiency of recognizing speakers.

Figure 4:
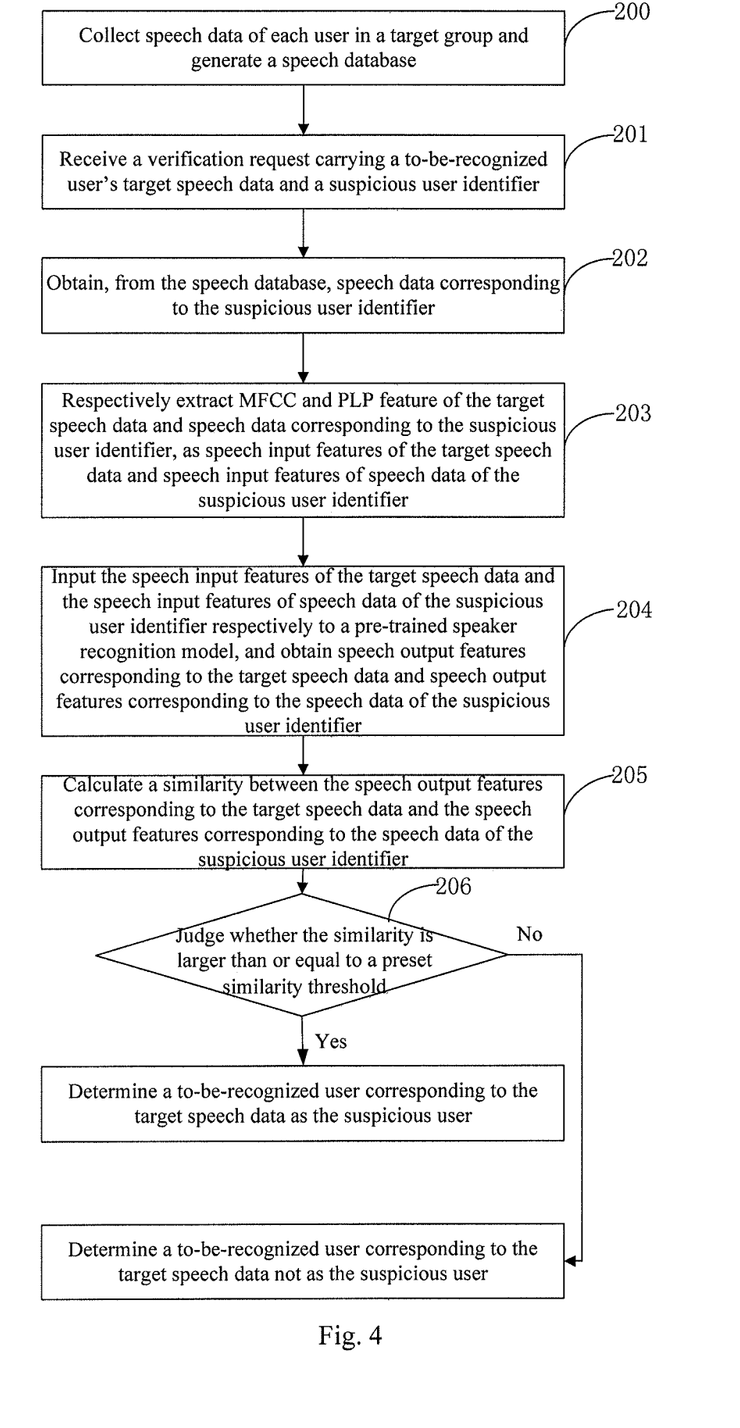
FIG. 4 is a flow chart of Embodiment 2 of a speaker recognition method according to the present disclosure.

FIG. 4 is a flow chart of Embodiment 2 of a speaker recognition method according to the present disclosure. The speaker recognition method of the present embodiment, on the basis of the technical solution of the embodiment shown in FIG. 1, expands the speaker recognition scenario of the embodiment shown in FIG. 1 to verify the speaker of the target speech data. As shown in FIG. 4, the speaker recognition method according to the present embodiment may specifically comprise the following steps:

200: collecting speech data of each user in a target group and generating a speech database;

Specifically, the speech data of each user in the speech database is stored according to a correspondence relationship between the user identifier (e.g., the user's index number) and the user's speech data. Reference may be made to related depictions in the above depictions for details, and details are not presented any more here.

201: receiving a verification request carrying to-be-recognized user's target speech data and a suspicious user identifier;

Wherein the to-be-recognized user is a user in the target group, and the suspicious user identifier is also an identifier of a user in the target group. The speaker recognition method in the present embodiment is specifically used to verify whether the user corresponding to the target speech data is a suspicious user.

202: obtaining, from the speech database, speech data corresponding to the suspicious user identifier;

203: respectively extracting MFCC and PLP feature of the target speech data and speech data corresponding to the suspicious user identifier, as speech input features of the target speech data and speech input features of speech data of the suspicious user identifier;

The present embodiment takes an example in which the input features include the MFCC and PLP feature simultaneously.

204: inputting the speech input features of the target speech data and the speech input features of speech data of the suspicious user identifier respectively to a pre-trained speaker recognition model, and obtaining speech output features corresponding to the target speech data and speech output features corresponding to the speech data of the suspicious user identifier;

205: calculating a similarity between the speech output features corresponding to the target speech data and the speech output features corresponding to the speech data of the suspicious user identifier;

206 judging whether the similarity is larger than or equal to a preset similarity threshold; if yes, determining a to-be-recognized user corresponding to the target speech data as the suspicious user; if no, determining a to-be-recognized user corresponding to the target speech data not as the suspicious user.

The speaker recognition method according to the present embodiment is an extension of the speaker recognition method of the embodiment shown in FIG. 1 and differs from the speaker recognition method of the embodiment shown in FIG. 1 in that the speaker recognition method of the embodiment shown in FIG. 1 is used to recognize to work out which user in the target group the to-be-recognized user belongs to, whereas the embodiment shown in FIG. 2 is verifying whether the to-be-recognized user is a certain suspicious user of the target group. Specific recognition procedures in the two embodiments are similar. Reference may be made to related depictions of the embodiment shown in FIG. 1 for a detailed implementation procedure, which will not be detailed any more here.

By employing the above technical solution, the speaker recognition method according to the present embodiment, on account of using the speaker recognition model based on the convolution neural network model, can accurately obtain the speech output features of each speech data, thereby more accurately recognizing the user corresponding to the target speech data and thereby substantially improving the efficiency of recognizing speakers.

Figure 5:
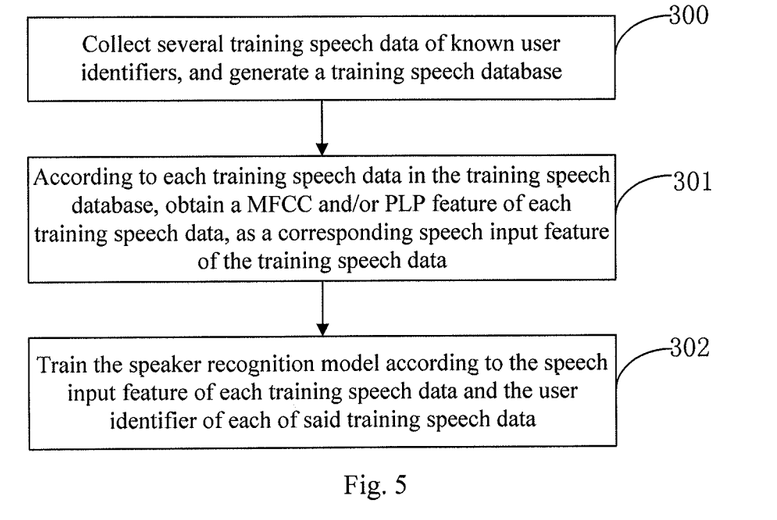
FIG. 5 is a flow chart of Embodiment 3 of a speaker recognition method according to the present disclosure.

FIG. 5 is a flow chart of Embodiment 3 of a speaker recognition method according to the present disclosure. The speaker recognition method of the present embodiment, on the basis of the technical solution of the embodiment shown in FIG. 1, may further comprise the following steps before step 101 "according to target speech data, a pre-collected speech database and a pre-trained speaker recognition model, obtaining speech output features corresponding to the target speech data and speech output features corresponding to each speech data in the speech database":

300: collecting several training speech data of known user identifiers, and generating a training speech database;

301: according to each training speech data in the training speech database, obtaining MFCC and/or PLP feature of each training speech data, as a corresponding speech input feature of the training speech data;

302: training the speaker recognition model according to the speech input feature of each training speech data and the user identifier of each training speech data.

Steps 300-302 of the present embodiment are used to train the speaker recognition model. In the present embodiment, when the speaker recognition model is trained, several training speech data of known user identifiers are first collected, and a training speech database is generated. The larger the number of training speech data included by the training speech database of the present embodiment is, more accurate parameters of the trained speaker recognition model are achieved, more accurate speech output features of the speech data are subsequently obtained according to the speaker recognition model, so that the more accurate the recognition of speakers is, the higher the recognition efficiency is. For example, the training speech database of the present embodiment may comprise 200,000-300,000 even more training speech data.

In the present embodiment, the amount of information obtained when the speech input feature of the training speech data are obtained according to each training speech data is identical with, and must be consistent with the amount of information included by the speech input features of the obtained target speech data when the speaker is recognized using the speaker recognition model. That is to say, if the employed speech input features is MFCC or PLP feature upon training, the speech input features employed upon recognition must be the corresponding MFCC or PLP feature. If the employed speech input features is MFCC and PLP feature upon training, the speech input features employed upon recognition must be the corresponding MFCC and PLP feature. Finally, the speaker recognition model is trained according to the speech input feature of each training speech data and the user identifier of each training speech data. The user identifier of each training speech data of the present embodiment specifically employs a class identifier of the user in the training speech database. For example, the training speech database comprises 300,000 speech data of 10,000 training users, each training user at least comprises at least one training speech data, and an identifier of each training user may be represented using 1-10,000, whereupon the corresponding user identifier may be the class identifier of the user in the training speech database. For example, identifiers of five users in 10,000 users may be represented as $A_{10000, 5}$.

For example, the step 302 "training the speaker recognition model according to the speech input feature of each training speech data and the user identifier of each training speech data" may specifically comprise the following steps:

(c1) inputting the speech input feature of each training speech data in the training speech database in turn to the speaker recognition model, and obtaining a corresponding speech output feature of the training speech data;

In the present embodiment, during training of the speaker recognition model, parameters in the speaker recognition model vary constantly, i.e., the speaker recognition model varies constantly. Upon training each time, the employed speaker recognition model is an updated speaker recognition model after training of a previous time. When the speaker recognition model of the present embodiment is initially used, each parameter employs a preset initial value.

(c2) generating a loss function of training speech data according to the speech output feature of the training speech data and the user identifier of the training speech data;

Specifically, it is feasible to convert the speech output features of the training speech data in dimensionality and obtain a matrix corresponding to the user classes in the training speech database, then perform normalization processing for all elements in the matrix, and each element in the matrix after the normalization processing represents a prediction probability that the current training speech data is of the user class corresponding to the element. For example, a position of a certain element in the matrix after the normalization processing is $A_{10000, 57}$, wherein 10000 is the number of all users in the training speech database, $A_{10000, 57}$ represents a position of the $57^{th}$ user of the 10000 users in the matrix, and $A_{10000, 57}$ may also be used to represent the identifier of the user's class identifier in the training speech database, also called user identifier. A value of the element at the position is 0.78 which represents the probability that the current training speech data belongs to the $57^{th}$ user in the 10000 users is 0.78. Therefore, the matrix after the normalization processing may also be called a prediction probability matrix. Since each element in the prediction probability matrix represents a prediction probability that the current training speech data belongs to the user at the position, a value of each element in the prediction probability matrix is a value larger than or equal to 0, or smaller than or equal to 1. Then, a real probability matrix of the user class corresponding to the training data is generated according to the user identifier of the training data. Since the real probability matrix is generated according to the real user identifier of the training speech data, the element only at the position of the user identifier corresponding to the training speech data in the real probability matrix has a value 1, and elements at other positions have a value 0. For example, if the user identifier of a certain training speech data is right $A_{10000, 57}$, the probability value only at the position $A_{10000, 57}$ is 1 and the probability values at remaining positions are all 0 in the real probability matrix corresponding to the training speech data. Since there is a difference between the prediction probability matrix and the real probability matrix, it is possible in the present embodiment to generate a loss function of the training speech data according to the difference between the prediction probability matrix and real probability matrix. A larger value of the loss function indicates that the difference between the prediction probability matrix and the real probability matrix is larger, whereupon it is necessary to optimize the parameter, and reduce the loss function until the loss function is infinitely close to zero, so that the speech output features output by the speaker recognition model can reflect the input speech data more really.

(c3) calculating derivatives of the loss function of the training speech data for parameters in the speaker recognition model;

(c4) according to the parameters and the derivatives of the loss function of the training speech data for the parameters in the speaker recognition model, updating the parameters in the speaker recognition model to thereby determine the speaker recognition model after the training this time;

(c5) repeatedly executing the above steps (c1)-(c4) until several training speech data in the training speech database train the speaker recognition model and determine the speaker recognition model after this round of training.

Specifically, since the speaker recognition model includes a plurality of parameters, when the input speech data is certain, the loss function may also be considered as a function about the parameters, whereupon it is feasible to calculate derivatives of the loss function of the speech data for parameters in the speaker recognition model; when each parameter in the speaker recognition model is updated, the parameter in the speaker recognition model may be updated as the parameter subtracting the derivative of the loss function for the parameter, and training each time updates the speaker recognition model. After the speaker recognition model is updated, the flow returns to step (c1) to begin to use the speech input feature of next training speech data to train the speaker recognition model until step (c4) which completes the training of the speaker recognition model by the speech input feature of next training speech data, and again updates the parameters in the speaker recognition model, thereby updating the speaker recognition model; the flow is performed so on so forth until the several training speech data train the speaker recognition model and determine the speaker recognition model after this round of training. The speaker recognition model obtained at this time may also be applied to recognition of speakers.

Since what is characterized by the loss function is a value falling towards a gradient direction, a larger value of the loss function indicates a more inaccurate result output by the speaker recognition model after performing processing for the speech input data of the input speech data. By adjusting the loss function constantly, the present embodiment makes the gradient of an ultimate point of the loss function be 0. A smaller value of the loss function indicates a more accurate processing result of the speaker recognition model. According to the technical solution of the above embodiment, when the speaker recognition model is updated, the updating is specifically performed in a gradually descending manner towards the loss function. Therefore, after constant training, constant optimization of the loss function and constant update of parameters of the speaker recognition model and thereby constant update of the speaker recognition model, a finally-obtained speaker recognition model can very accurately process the speech data and extract more accurate speech output features.

Further optionally, it is further possible to train the speaker recognition model according to several said training speech data in the training speech database in each round of training shown in the above steps (c1)-(c5), and use the several training speech data in the training speech database to repeatedly train the speaker recognition model N rounds, to obtain a final speaker recognition model.

For example, when the training speech database includes 200,000 training speech data, after the 200,000 training speech data in the training speech database are used in turn to train the speaker recognition model, it can be believed that one round of training of the speaker recognition model is completed; then the 200,000 training speech data in the training speech database are used again according to each round of training of the speaker recognition model to train the speaker recognition model N-1 rounds to obtain a final speaker recognition model. In the present embodiment, the value of the loss function may be made close to zero after many rounds of training, thereby further improving the accuracy of the speech output features of the speech data extracted by the speaker recognition model obtained after training and thereby further improving the efficiency of recognizing speakers base on the speaker recognition model. N in the present embodiment may take a positive integer according to practical experience, for example, the N may be a positive integer such as 5, 6 or 8, 10.

By employing the above speaker recognition model based on the convolution neural network model, the speaker recognition method according to the present embodiment can accurately obtain the speech output features of each speech data, thereby more accurately recognizing the user corresponding to the target speech data and thereby substantially improving the efficiency of recognizing speakers.

Figure 6:
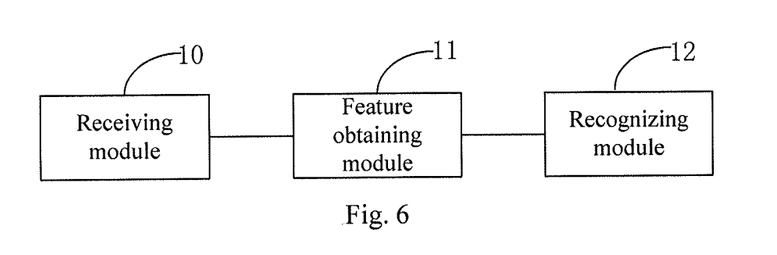
FIG. 6 is a structural diagram of Embodiment 1 of a speaker recognition apparatus according to the present disclosure.

FIG. 6 is a structural diagram of Embodiment 1 of a speaker recognition apparatus according to the present disclosure. As shown in FIG. 6, the speaker recognition apparatus according to the present embodiment may specifically comprise: a receiving module 10, a feature obtaining module 11 and a recognizing module 12.

Wherein the receiving module 10 is configured to receive target speech data of a to-be-recognized user in a target group;

The feature obtaining module 11 is configured to, according to the target speech data received by the receiving module 10, a pre-collected speech database and a pre-trained speaker recognition model, obtain speech output features corresponding to the target speech data and speech output features corresponding to each speech data in the speech database; the speaker recognition model according to the present embodiment employs a convolution neural network model;

The recognizing module 12 is configured to recognize the user corresponding to the target speech data according to the speech output features corresponding to the target speech data obtained by the feature obtaining module 11 and the speech output features corresponding to each speech data in the speech database obtained by the feature obtaining module 11.

The speaker recognition apparatus according to the present embodiment, by using the above modules, implements speaker recognition with the same principle and technical effect as the above related method embodiments. Reference may be made to the above depictions of related method embodiments for details, which will not be provided any more here.

Figure 7:
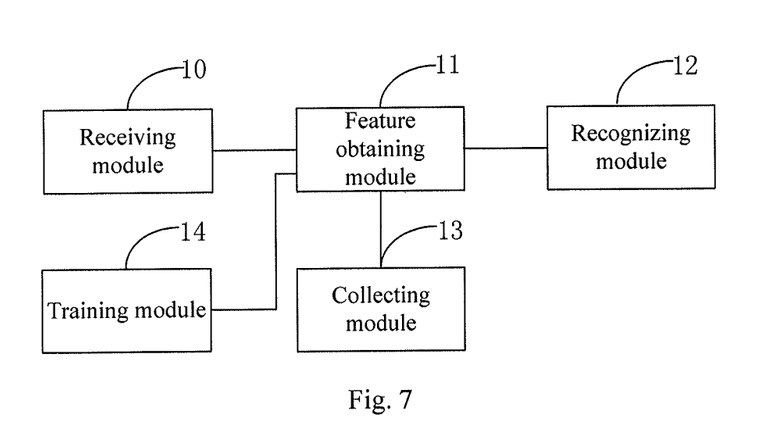
FIG. 7 is a structural diagram of Embodiment 2 of a speaker recognition apparatus according to the present disclosure.

FIG. 7 is a structural diagram of Embodiment 2 of a speaker recognition apparatus according to the present disclosure. As shown in FIG. 7, the speaker recognition apparatus according to the present embodiment, on the basis of the technical solution of the embodiment shown in FIG. 6, further introduces the technical solution of the present disclosure in more detail.

As shown in FIG. 7, the speaker recognition apparatus according to the present embodiment further comprises: a collecting module 13 and a training module 14.

Wherein the collecting module 13 is configured to collect several training speech data of known user identifiers, and generate a training speech database;

The feature obtaining module 11 is configured to, according to each training speech data in the training speech database collected by the collecting module 13, obtain a Mel-Frequency Cepstral Coefficient and/or a Perceptual Linear Predictive feature of each training speech data, as a corresponding speech input feature of the training speech data;

The training module 14 is configured to train the speaker recognition model according to the speech input feature of each training speech data obtained by the feature obtaining module 11 and the user identifier of each training speech data.

Correspondingly, the feature obtaining module 11 is configured to, according to the target speech data received by the receiving module 10, the pre-collected speech database and the speaker recognition model pre-trained by the training module 14, obtain speech output features corresponding to the target speech data and speech output features corresponding to each speech data in the speech database.

Further optionally, in the speaker recognition apparatus according to the present embodiment, the training module 14 is specifically configured to:

input the speech input feature of each training speech data in the training speech database obtained by the feature obtaining module 11 in turn to the speaker recognition model, and obtaining a corresponding speech output feature of the training speech data; when the speaker recognition model of the present embodiment is initially used, each parameter employs a preset initial value;

generate a loss function of training speech data according to the speech output feature of the training speech data and the user identifier of the training speech data;

calculate derivatives of the loss function of the training speech data for parameters in the speaker recognition model;

according to the parameters and the derivatives of the loss function of the training speech data for the parameters in the speaker recognition model, update the parameters in the speaker recognition model to thereby determine the speaker recognition model after the training this time; repeatedly execute the above steps until several training speech data in the training speech database train the speaker recognition model and determine the speaker recognition model after this round of training.

Further optionally, in the speaker recognition apparatus of the present embodiment, the training module 14 is further specifically configured to train the speaker recognition model according to several said training speech data in the training speech database in aforesaid each round of training, and use the several training speech data in the training speech database to repeatedly train the speaker recognition model N rounds, to obtain a final speaker recognition model.

Further optionally, in the speaker recognition apparatus according to the present embodiment, the recognizing module 12 is configured to:

respectively calculate similarity between the speech output features corresponding to the target speech data and the speech output features corresponding to each speech data in the speech database;

obtain a user identifier corresponding to speech data whose similarity with the speech output features corresponding to the target speech data is larger than or equal to a preset similarity threshold, as an identifier of the user corresponding to the target speech data; or obtain a user identifier corresponding to speech data whose similarity with the speech output features corresponding to the target speech data is a maximum, as an identifier of the user corresponding to the target speech data.

The speaker recognition apparatus according to the present embodiment, by using the above modules, implements speaker recognition with the same principle and technical effect as the above related method embodiments. Reference may be made to the above depictions of related method embodiments for details, which will not be provided any more here.

Figure 8:
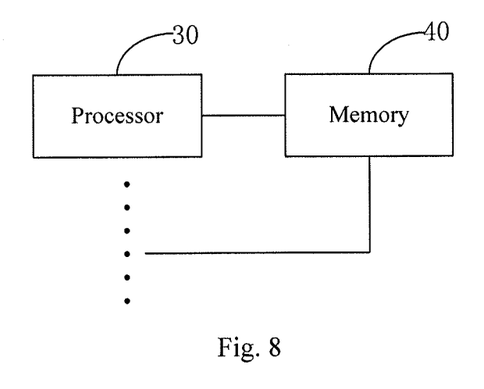
FIG. 8 is a structural diagram of an embodiment of a computer device according to the present disclosure.

FIG. 8 is a structural diagram of an embodiment of a computer device according to the present disclosure. As shown in FIG. 8, the computer device of the present embodiment comprises: one or more processors 30, and a memory 40, wherein the memory 40 is used to store one or more programs, and wherein when the one or more programs stored in the memory 40 are executed by the one or more processors 30, the one or more processors 30 are enabled to implement the speaker recognition method of embodiments shown in FIG. 1-FIG. 7. The embodiment shown in FIG. 8 takes an example of the computer device comprising a plurality of processors 30.

Figure 9:
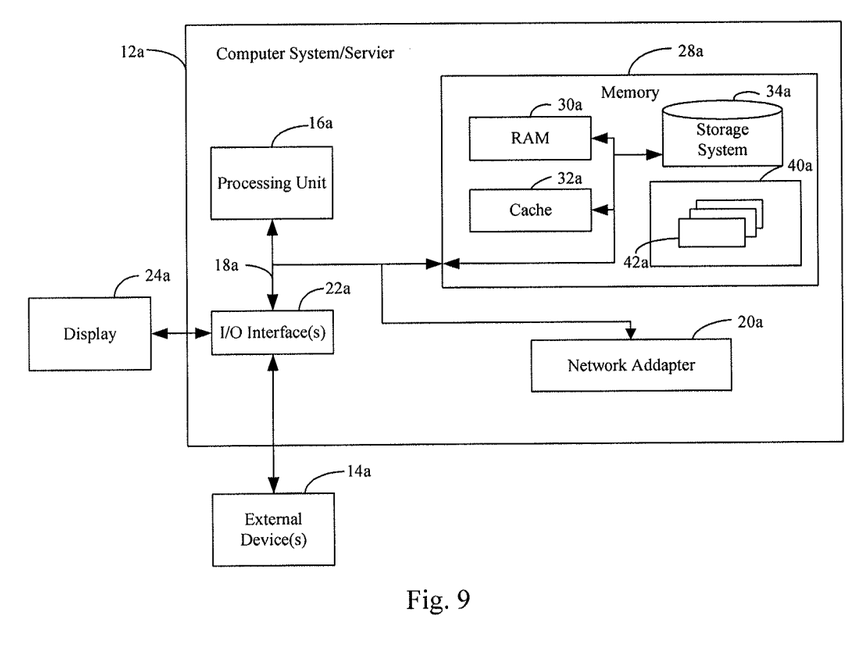
FIG. 9 is an example diagram of a computer device according to the present disclosure.

For example, FIG. 9 is an example diagram of a computer device according to the present disclosure. FIG. 9 shows a block diagram of an exemplary computer device 12*a* adapted to implement the embodiment of the present disclosure. The computer device 12*a* shown in FIG. 9 is only an example and should not bring about any limitation to the function and range of use of the embodiments of the present disclosure.

As shown in FIG. 9, the computer device 12*a* is shown in the form of a general-purpose computing device. The components of computer device 12*a* may include, but are not limited to, one or more processors or processing units 16*a*, a system memory 28*a*, and a bus 18*a* that couples various system components including system memory 28*a* and the processor 16*a*.

Bus 18*a* represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12*a* typically includes a variety of computer system readable media. Such media may be any available media that is accessible by computer device 12*a*, and it includes both volatile and non-volatile media, removable and non-removable media.

System memory 28*a* can include computer system readable media in the form of volatile memory, such as random access memory (RAM) 30*a* and/or cache memory 32*a*. Computer device 12*a* may further include other removable/non-removable, volatile/non-volatile computer system storage media. By way of example only, storage system 34*a* can be provided for reading from and writing to a non-removable, non-volatile magnetic media (not shown in FIG. 9 and typically called a "hard drive"). Although not shown in FIG. 9, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18*a* by one or more data media interfaces. The memory 28*a* may include at least one program product having a set (e.g., at least one) of program modules that are configured to carry out the functions of embodiments of the present disclosure shown in FIG. 1-FIG. 7.

Program/utility 40*a*, having a set (at least one) of program modules 42*a*, may be stored in memory 28*a* by way of example, and not limitation, as well as an operating system, one or more application programs, other program modules, and program data. Each of the operating system, one or more application programs, other program modules, and program data or some combination thereof, may include an implementation of a networking environment. Program modules 42*a* generally carry out the functions and/or methodologies of embodiments of the present disclosure as described with reference to FIG. 1-FIG. 7.

Computer device 12*a* may also communicate with one or more external devices 14*a* such as a keyboard, a pointing device, a display 24*a*, etc.; one or more devices that enable a user to interact with computer device 12*a*; and/or any devices (e.g., network card, modem, etc.) that enable computer device 12*a* to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted, network adapter 20a communicates with the other components of computer device 12a via bus 18a. It should be understood that although not shown, other hardware and/or software components could be used in conjunction with computer device 12a. Examples, include, but are not limited to: microcode, device drivers, redundant processing units, external disk drive arrays, RAID systems, tape drives, and data archival storage systems, etc.

The processing unit 16a executes various function applications and data processing by running programs stored in the system memory 28a, for example, implement the speaker recognition method as shown in the embodiments.

The present disclosure further provides a computer-readable storage medium on which a computer program is stored. The program is executed by a processor to implement the speaker recognition method shown in the above embodiments.

The computer-readable medium of the present embodiment may include the RAM 30a, and/or cache memory 32a, and/or storage system 34a in the system memory 28a in the embodiment shown in FIG. 9.

Along with science and technological development, a propagation channel of the computer program is no longer limited to a tangible medium, and it may be downloaded directly from the network, or obtained in other manners. Therefore, the computer-readable medium in the present embodiment may comprise a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A speaker recognition method, wherein the method comprises:
   receiving target speech data of a to-be-recognized user in a target group;
   according to the target speech data, a pre-collected speech database and a pre-trained speaker recognition model, obtaining speech output features corresponding to the target speech data and speech output features corresponding to each of the speech data in the speech database; the speaker recognition model employs a convolution neural network model, the convolution neural network model implementing a sequence average-pooling technology so as to ensure that the speaker recognition model outputs features of a fixed size for speech input features of speech data of any length, wherein the features of the fixed size are represented by vectors with a same dimensionality;

recognizing the user corresponding to the target speech data according to the speech output features corresponding to the target speech data and the speech output features corresponding to each of the speech data in the speech database, wherein the speaker recognition model is pre-trained by the following steps of collecting training speech data of known user identifiers;

training the speaker recognition model according to the speech input feature of each training speech data and the user identifier of each of the training speech data;

wherein the loss function of the speaker recognition model is obtained from the difference between the prediction probability matrix and the real probability matrix; the prediction probability matrix is a probability matrix of each user class corresponding to the training speech data which is obtained by converting and normalizing the speech output features after the speech output features is outputted by the speaker recognition model for the speech input features of the training voice data; the real probability matrix is a probability matrix of each user class corresponding to the training speech data is generated according to the user identifier corresponding to the training speech data.

2. The method according to claim 1, wherein
the speech input features comprise a Mel-Frequency Cepstral Coefficient and/or a Perceptual Linear Predictive feature.

3. The method according to claim 1, wherein the training the speaker recognition model according to the speech input feature of each training speech data and the user identifier of each of the training speech data specifically comprises:

inputting the speech input feature of each training speech data in turn to the speaker recognition model, and obtaining a corresponding speech output feature of the training speech data;

generating a loss function of training speech data according to the speech output feature of the training speech data and the user identifier of the training speech data;

calculating derivatives of the loss function of the training speech data for parameters in the speaker recognition model;

according to the parameters and the derivatives of the loss function of the training speech data for the parameters in the speaker recognition model, updating the parameters in the speaker recognition model to thereby determine the speaker recognition model after the training this time;

repeatedly executing the above steps until each training speech data train the speaker recognition model and determine the speaker recognition model after this round of training.

4. The method according to claim 3, wherein the training the speaker recognition model according to the speech input feature of each training speech data and the user identifier of each of the training speech data further comprises:

training the speaker recognition model according to several the training speech data in the training speech database in aforesaid each round of training, and using the several training speech data in the training speech database to repeatedly train the speaker recognition model N rounds, to obtain a final speaker recognition model.

5. The method according to claim 1, wherein the recognizing the user corresponding to the target speech data according to the speech output features corresponding to the target speech data and the speech output features corresponding to each of the speech data in the speech database specifically comprises:

respectively calculating similarity between the speech output features corresponding to the target speech data and the speech output features corresponding to each speech data in the speech database;

obtaining a user identifier corresponding to speech data whose similarity with the speech output features corresponding to the target speech data is larger than or equal to a preset similarity threshold, as an identifier of the user corresponding to the target speech data; or obtaining a user identifier corresponding to speech data whose similarity with the speech output features corresponding to the target speech data is a maximum, as an identifier of the user corresponding to the target speech data.

6. A computer device, wherein the computer device comprises:

one or more processors;

a memory for storing one or more programs, when the one or more programs are executed by the one or more processors, the one or more processors are enabled to implement the following operations:

receiving target speech data of a to-be-recognized user in a target group;

according to the target speech data, a pre-collected speech database and a pre-trained speaker recognition model, obtaining speech output features corresponding to the target speech data and speech output features corresponding to each of the speech data in the speech database; the speaker recognition model employs a convolution neural network model, the convolution neural network model implementing a sequence average-pooling technology so as to ensure that the speaker recognition model outputs features of a fixed size for speech input features of speech data of any length, the features of the fixed size are represented by vectors with a same dimensionality;

recognizing the user corresponding to the target speech data according to the speech output features corresponding to the target speech data and the speech output features corresponding to each of the speech data in the speech database, wherein the speaker recognition model is pre-trained by the following steps of collecting training speech data of known user identifiers;

training the speaker recognition model according to the speech input feature of each training speech data and the user identifier of each of the training speech data;

wherein the loss function of the speaker recognition model is obtained from the difference between the prediction probability matrix and the real probability matrix; the prediction probability matrix is a probability matrix of each user class corresponding to the training speech data which is obtained by converting and normalizing the speech output features after the speech output features is outputted by the speaker recognition model for the speech input features of the training voice data; the real probability matrix is a probability matrix of each user class corresponding to the training speech data is generated according to the user identifier corresponding to the training speech data.

7. The computer device according to claim 6, wherein the speech input features comprise a Mel-Frequency Cepstral Coefficient and/or a Perceptual Linear Predictive feature.

8. The computer device according to claim 6, wherein the training the speaker recognition model according to the speech input feature of each training speech data and the user identifier of each of the training speech data specifically comprises:
  inputting the speech input feature of each training speech data in turn to the speaker recognition model, and obtaining a corresponding speech output feature of the training speech data;
  generating a loss function of training speech data according to the speech output feature of the training speech data and the user identifier of the training speech data;
  calculating derivatives of the loss function of the training speech data for parameters in the speaker recognition model;
  according to the parameters and the derivatives of the loss function of the training speech data for the parameters in the speaker recognition model, updating the parameters in the speaker recognition model to thereby determine the speaker recognition model after the training this time;
  repeatedly executing the above steps until each training speech data train the speaker recognition model and determine the speaker recognition model after this round of training.

9. The computer device according to claim 8, wherein the training the speaker recognition model according to the speech input feature of each training speech data and the user identifier of each of the training speech data further comprises:
  training the speaker recognition model according to several the training speech data in the training speech database in aforesaid each round of training, and using the several training speech data in the training speech database to repeatedly train the speaker recognition model N rounds, to obtain a final speaker recognition model.

10. The computer device according to claim 6, wherein the recognizing the user corresponding to the target speech data according to the speech output features corresponding to the target speech data and the speech output features corresponding to each of the speech data in the speech database specifically comprises:
  respectively calculating similarity between the speech output features corresponding to the target speech data and the speech output features corresponding to each speech data in the speech database;
  obtaining a user identifier corresponding to speech data whose similarity with the speech output features corresponding to the target speech data is larger than or equal to a preset similarity threshold, as an identifier of the user corresponding to the target speech data; or obtaining a user identifier corresponding to speech data whose similarity with the speech output features corresponding to the target speech data is a maximum, as an identifier of the user corresponding to the target speech data.

11. A non-transitory computer-readable medium on which a computer program is stored, wherein the program, when executed by the processor, implements the following operations:
  receiving target speech data of a to-be-recognized user in a target group;
  according to the target speech data, a pre-collected speech database and a pre-trained speaker recognition model, obtaining speech output features corresponding to the target speech data and speech output features corresponding to each of the speech data in the speech database; the speaker recognition model employs a convolution neural network model, the convolution neural network model implementing a sequence average-pooling technology so as to ensure that the speaker recognition model outputs features of a fixed size for speech input features of speech data of any length, the features of the fixed size are represented by vectors with a same dimensionality;
  recognizing the user corresponding to the target speech data according to the speech output features corresponding to the target speech data and the speech output features corresponding to each of the speech data in the speech database,
  wherein the speaker recognition model is pre-trained by the following steps of
  collecting training speech data of known user identifiers;
  training the speaker recognition model according to the speech input feature of each training speech data and the user identifier of each of the training speech data;
  wherein the loss function of the speaker recognition model is obtained from the difference between the prediction probability matrix and the real probability matrix; the prediction probability matrix is a probability matrix of each user class corresponding to the training speech data which is obtained by converting and normalizing the speech output features after the speech output features is outputted by the speaker recognition model for the speech input features of the training voice data; the real probability matrix is a probability matrix of each user class corresponding to the training speech data is generated according to the user identifier corresponding to the training speech data.

12. The non-transitory computer-readable medium according to claim 11, wherein
  the speech input features comprise a Mel-Frequency Cepstral Coefficient and/or a Perceptual Linear Predictive feature.

13. The non-transitory computer-readable medium according to claim 11, wherein the training the speaker recognition model according to the speech input feature of each training speech data and the user identifier of each of the training speech data specifically comprises:
  inputting the speech input feature of each training speech data in turn to the speaker recognition model, and obtaining a corresponding speech output feature of the training speech data;
  generating a loss function of training speech data according to the speech output feature of the training speech data and the user identifier of the training speech data;
  calculating derivatives of the loss function of the training speech data for parameters in the speaker recognition model;

according to the parameters and the derivatives of the loss function of the training speech data for the parameters in the speaker recognition model, updating the parameters in the speaker recognition model to thereby determine the speaker recognition model after the training this time;

repeatedly executing the above steps until each training speech data train the speaker recognition model and determine the speaker recognition model after this round of training.

14. The non-transitory computer-readable medium according to claim 13, wherein the training the speaker recognition model according to the speech input feature of each training speech data and the user identifier of each of the training speech data further comprises:

training the speaker recognition model according to several the training speech data in the training speech database in aforesaid each round of training, and using the several training speech data in the training speech database to repeatedly train the speaker recognition model N rounds, to obtain a final speaker recognition model.

15. The non-transitory computer-readable medium according to claim 11, wherein the recognizing the user corresponding to the target speech data according to the speech output features corresponding to the target speech data and the speech output features corresponding to each of the speech data in the speech database specifically comprises:

respectively calculating similarity between the speech output features corresponding to the target speech data and the speech output features corresponding to each speech data in the speech database;

obtaining a user identifier corresponding to speech data whose similarity with the speech output features corresponding to the target speech data is larger than or equal to a preset similarity threshold, as an identifier of the user corresponding to the target speech data; or obtaining a user identifier corresponding to speech data whose similarity with the speech output features corresponding to the target speech data is a maximum, as an identifier of the user corresponding to the target speech data.

* * * * *